US012779775B2

(12) United States Patent
Ihnatisin

(10) Patent No.: US 12,779,775 B2
(45) Date of Patent: Nov. 3, 2026

(54) 3D PRINTING APPARATUS

(71) Applicant: ORBITAL MATTER POLAND Sp. Z o.o., Warsaw (PL)

(72) Inventor: Robert-Alexandru Ihnatisin, Berlin (DE)

(73) Assignee: ORBITAL MATTER POLAND Sp. Z o.o., Warsaw (PL)

( * ) Notice: Subject to any disclaimer, the term of this patent is extended or adjusted under 35 U.S.C. 154(b) by 94 days.

(21) Appl. No.: 18/477,645

(22) Filed: Sep. 29, 2023

(65) Prior Publication Data

US 2024/0109243 A1 Apr. 4, 2024

(30) Foreign Application Priority Data

Sep. 30, 2022 (GB) ..................................... 2214342

(51) Int. Cl.
*B29C 64/118* (2017.01)
*B29C 35/02* (2006.01)
(Continued)

(52) U.S. Cl.
CPC ............ *B29C 64/118* (2017.08); *B29C 35/02* (2013.01); *B29C 64/209* (2017.08);
(Continued)

(58) Field of Classification Search
CPC ... B29C 64/106; B29C 64/112; B29C 64/118; B29C 64/165; B29C 64/25;
(Continued)

(56) References Cited

U.S. PATENT DOCUMENTS

2015/0076732 A1* 3/2015 Kemmer ............... B29C 64/118 425/375
2017/0036783 A1 2/2017 Snyder
(Continued)

FOREIGN PATENT DOCUMENTS

CN 207255249 U * 4/2018
CN 108248013 A 7/2018
(Continued)

OTHER PUBLICATIONS

Chen, CN207255249U, 2018 (Generated Aug. 14, 2025), Espacenet (Year: 2018).*

(Continued)

*Primary Examiner* — Andrew L Swanson
(74) *Attorney, Agent, or Firm* — Keefe IP Law, PLLC

(57) ABSTRACT

In general terms the present invention proposes a 3D printing apparatus 100 for printing a satellite component. The 3D printing apparatus comprises a housing 102, a seal 104 arranged movably inside the housing such that the seal partitions the housing into first and second chambers 106A, 106B that are fluidically isolated from each other, and a nozzle 108 in fluid connection with the second chamber 106B. The first chamber 106A comprises a gas having a pressure $P_1$ and the second chamber 106B comprises a printing material. When the 3D printing apparatus 100 is exposed to an external environment having a pressure $P_2$ being less than the pressure $P_1$ of the gas in the first chamber 106A, the gas in the first chamber 106A exerts a force on the seal 104 which in turn exerts a force on the printing material thereby extruding the printing material out of the second chamber 106B through the nozzle 108 to print the satellite component.

18 Claims, 5 Drawing Sheets

(51) Int. Cl.

| | |
|---|---|
| ***B29C 64/209*** | (2017.01) |
| ***B29C 64/236*** | (2017.01) |
| ***B29C 64/241*** | (2017.01) |
| ***B29C 64/245*** | (2017.01) |
| ***B29C 64/25*** | (2017.01) |
| ***B29C 64/264*** | (2017.01) |
| ***B29C 64/371*** | (2017.01) |
| ***B29C 64/393*** | (2017.01) |
| ***B33Y 10/00*** | (2015.01) |
| ***B33Y 30/00*** | (2015.01) |
| ***B33Y 50/02*** | (2015.01) |
| ***B33Y 80/00*** | (2015.01) |
| ***H01Q 1/08*** | (2006.01) |
| *B29C 35/08* | (2006.01) |
| *B29L 31/34* | (2006.01) |

(52) U.S. Cl.

CPC .......... *B29C 64/236* (2017.08); *B29C 64/241* (2017.08); *B29C 64/245* (2017.08); *B29C 64/25* (2017.08); *B29C 64/264* (2017.08); *B29C 64/371* (2017.08); *B29C 64/393* (2017.08); *B33Y 10/00* (2014.12); *B33Y 30/00* (2014.12); *B33Y 50/02* (2014.12); *B33Y 80/00* (2014.12); *H01Q 1/08* (2013.01); *B29C 2035/0216* (2013.01); *B29C 2035/0827* (2013.01); *B29L 2031/34* (2013.01); *B29L 2031/3456* (2013.01)

(58) Field of Classification Search

CPC ..... B29C 64/209; B41J 2/03; B41J 2002/031; B41J 2002/032; B41J 2002/033; B33Y 10/00; B33Y 30/00

See application file for complete search history.

(56) References Cited

U.S. PATENT DOCUMENTS

| | | | |
|---|---|---|---|
| 2019/0047309 A1* | 2/2019 | Weiss | B05B 15/50 |
| 2019/0217541 A1 | 7/2019 | Duro Royo et al. | |
| 2020/0138602 A1* | 5/2020 | Solorzano | B29C 64/264 |
| 2020/0384683 A1* | 12/2020 | Kunihiro | B33Y 40/00 |
| 2021/0069971 A1 | 3/2021 | Berthelot | |
| 2021/0115274 A1 | 4/2021 | Weiss et al. | |
| 2021/0129433 A1 | 5/2021 | Gilan et al. | |
| 2021/0245440 A1 | 8/2021 | Shitrit | |
| 2025/0001692 A1* | 1/2025 | Ramot | B29C 33/40 |

FOREIGN PATENT DOCUMENTS

| | | |
|---|---|---|
| CN | 108907200 A | 11/2018 |
| CN | 209208082 | 8/2019 |
| JP | S63284099 A | 11/1988 |
| WO | 2012094678 A2 | 7/2012 |

OTHER PUBLICATIONS

Intellectual Property Office, Combined Search and Examination Report under Sections 17 and 18(3) issued for United Kingdom Patent Application GB2214342.4, on Mar. 29, 2023, 07 Pages.

European Patent Office, Extended European Search Report, Application No. EP23200845.8, Mailed on May 7, 2024, 16 Pages.

Intellectual Property Office, Examination Report dated under Section 18(3) for United Kingdom Patent Application GB2214342.4 on Jul. 16, 2025, 2 pages.

* cited by examiner

3D PRINTING APPARATUS

TECHNICAL FIELD

This invention relates to 3D printing. In particular, though not exclusively, this invention relates to a 3D printing apparatus for printing a satellite component, a system for positioning a satellite component comprising the 3D printing apparatus, and to a method for 3D printing a satellite component.

BACKGROUND

At present, spacecraft devices and large structural components that are to be used in outer space have to be manufactured on Earth and transported to outer space using a rocket. This is a highly inefficient process due to the high costs and limited payload capacity that arise when using rockets to transport everything to outer space.

A potential solution to this problem would be to manufacture spacecraft devices and structural components directly in outer space, for example by 3D printing. Conventional 3D printing relies on the use of thermoplastic filaments, which need to be melted, deposited and then cooled down in a layer-by-layer fashion in order to create complex 3D objects. For this printing method to work, the 3D printer needs to be able to quickly cool down the melted plastic. However, in the vacuum of outer space, heat can only dissipate via infrared radiation, which is a slow process. Therefore, conventional 3D printing is unable to operate effectively in outer space.

In order to overcome this issue, a different type of 3D printer that extrudes photopolymers and cures them with UV light could be employed. At room temperature, such photopolymers would be in a liquid state and so would be difficult to extrude consistently and reliably in outer space. This is due to microgravity, which causes liquids to clump together in a ball. Therefore, in order to sufficiently increase the viscosity of the photopolymers so that they could be used for printing, it would be necessary to add various thickening agents. The problem with adding enough thickening agents to make the photopolymers printable via extrusion is that it would make them difficult to handle and induce significant wear and tear to the printing mechanism, which would be a significant issue in outer space. When it comes to handling, the thickened photopolymers would be difficult to pump around and as a result a resupply mission for such a 3D printer in outer space would be very difficult, if not impossible.

Hence, there remains a need for improved 3D printers that can function effectively in outer space. It is an object of the invention to address at least one of the above problems, or another problem associated with the prior art.

SUMMARY OF THE INVENTION

A first aspect of the invention provides a three-dimensional (3D) printing apparatus for printing a satellite component, the 3D printing apparatus comprising: a housing; a seal arranged movably inside the housing such that the seal partitions the housing into first and second chambers that are fluidically isolated from each other; and a nozzle in fluid connection with the second chamber. The first chamber comprises a gas having a pressure $P_1$. The second chamber comprises a printing material. When the 3D printing apparatus is exposed to an external environment having a pressure $P_2$ being less than the pressure $P_1$ of the gas in the first chamber, the gas in the first chamber exerts a force on the seal which in turn exerts a force on the printing material thereby extruding the printing material out of the second chamber through the nozzle for printing the satellite component.

Herein, the term "satellite component" refers to a part or element that is intended for use in a satellite. It might be a piece of satellite hardware, a sensor, an antenna, or any other component that belongs to a satellite. Common examples of satellite components include solar panels, antennas, booms, sensors, and scientific instruments. It will be appreciated that the satellite component is 3D printed using the 3D printing apparatus under specific conditions as described hereafter.

In this way, the 3D printing apparatus may conveniently rely on the difference in pressure of the gas in the first chamber and the external environment (i.e. the environment outside of the housing). Advantageously, this may allow the 3D printing apparatus to operate in low vacuum environments, for example, such as in outer space. Moreover, as the 3D printing apparatus relies on a pressure differential to operate, it may be able to passively extrude the printing material, thereby requiring little or no power to operate. In particular, the claimed 3D printing apparatus may not require any motors to generate an extrusion force.

Without wishing to be bound by theory, the 3D printing apparatus utilises the physical properties of expanding gases according to the Joule expansion. When the 3D printing apparatus is exposed to an external environment having a pressure $P_2$ being less than the pressure $P_1$ of the gas in the first chamber, this creates a pressure differential that wants to equalise due to thermodynamics. As a result, the gas in the first chamber expands. This gas expansion in the first chamber generates a force that gets applied to the movable seal. In this way, the expanding gas in the first chamber may push the seal into or towards the second chamber, thereby applying a force to the printing material in the second chamber and causing the printing material to be extruded out of the second chamber through the nozzle.

Beneficially, the seal that drives the printing material due to the pressure differential in the three-dimensional (3D) printing apparatus offers several potential benefits as compared to conventional mechanical or electromagnetic extrusion structures, such as piston, screw extrusion system, other pneumatic or hydraulic mechanisms, and so on, as used in the prior art. In particular, such conventional extrusion structures can have exposed surfaces that if not cleaned can be sources of contamination for the printing material that they contact. Moreover, such conventional extrusion systems require regular maintenance activity to maintain smooth (lubricated) movement thereof when in use. Using the seal with a pressure-driven material eliminates the need for such conventional extrusion systems thereby reducing the risk of contamination and making the process more hygienic. Moreover, the seals have few moving parts, thereby simplifies maintenance (reduced friction, reduced cross-contamination) and reduces the likelihood of mechanical failures. Moreover, seals are compatible for a wider range of materials, varying viscosities of such materials and various production volumes (scalability).

In some embodiments, the nozzle may comprise a temperature control module. The temperature control module may be used to regulate the temperature of the nozzle, thereby controlling the temperature of the printing material being extruded through the nozzle. Advantageously, this may allow the viscosity of the printing material to be regulated as it is extruded from the nozzle, without the need for adding thickening additives to the printing material or relying on complex material handling methods.

Suitably, the temperature control module may comprise a Peltier module. A Peltier module has the ability to both heat and cool (i.e. increase and decrease temperature) by changing around the negative and positive voltages applied to its power input. In this way, the temperature module may conveniently be able to both heat up the nozzle and cool down the nozzle. Moreover, the use of a Peltier module may advantageously allow the nozzle to be cooled to temperatures below 0° C.

By using temperatures below 0° C., the viscosity of the printing material may be increased sufficiently in order to make it solid enough to be extruded via the nozzle and/or for it to stay in place after extrusion so that it can be hardened in its extruded form. The nozzle may also be heated (i.e. to temperatures above 0° C.) in order to decrease the viscosity of the printing material, in case the printing material is more viscous than required.

In some embodiments, the nozzle may comprise a heat exchanger (i.e. a heat/cold radiator). Suitably, the heat exchanger may comprise one or more radiator fins. The heat exchanger may conveniently be arranged to work in conjunction with the temperature control module to absorb or dissipate heat from nozzle. Suitably, the heat exchanger may be passive and/or actively temperature controlled.

The temperature control module may conveniently be arranged to control the temperature of the printing material being extruded from the nozzle in a range of from −50° C. to 150° C. For example, the temperature control module may be arranged to control the temperature of the printing material being extruded from the nozzle in a range of from −20° C. to 150° C.

Suitably, the printing material may comprise a liquid photopolymer. The liquid photopolymer may comprise one or more monomers, oligomers and/or photoinitiators. The monomers may comprise one or more of styrene, N-vinylpyrrolidone, and/or acrylates. The oligomers may comprise one or more of epoxides, urethanes, polyethers, and/or polyesters. The photoinitiators may comprise one or more of benzophenone, xanthones, quinones, benzoin ethers, acetophenones, benzoyl oximes, acylphosphines, onium salts, and/or pyridinium salts.

In some embodiments, the gas in the first chamber may comprise a noble gas. For example, the gas may comprise one or more of neon, argon, krypton, and/or xenon. Beneficially, the use of noble gases can help address specific challenges associated with 3D printing in space. For example, argon or helium can create an inert environment within the first chamber to prevent issues (such as materials reacting or outgassing) and ensure stable and predictable printing conditions. Moreover, noble gases maintain stable temperature control within the first chamber, preventing rapid temperature fluctuations that could impact the printing process. Furthermore, noble gases can be used to precisely control the flow of printing materials, ensuring accurate deposition even in microgravity conditions. This precise control is essential for maintaining the quality and structural integrity of printed objects being constructed in the space. Additionally, noble gases are non-flammable, making them safer than other gases in the event of unexpected fires or electrical malfunctions inside the 3D printing apparatus. It will be appreciated that space missions have limited power resources, therefore, noble gases can be used for efficient cooling and heat transfer, helping to conserve energy and ensure the 3D printing process operates optimally. In the nutshell, using noble gases for pressure-differential and seal-based 3D printing processes in space can enhance the reliability, safety, and quality of printed objects while addressing the unique challenges of the space environment.

In some embodiments, the pressure $P_1$ of the gas in the first chamber may be less than 1 atm (101 kPa). For example, the pressure $P_1$ of the gas may be less than 0.9 atm (91 kPa), or less than 0.8 atm (81 kPa), or less than 0.7 atm (71 kPa), or less than 0.6 atm (61 kPa), or less than 0.5 atm (51 kPa), or less than 0.4 atm (41 kPa), or less than 0.3 atm (30 kPa), or less than 0.2 atm (20 kPa), or even less than 0.1 atm (10 kPa). In this way, the 3D printing apparatus may operate at pressures lower than the atmospheric pressure on Earth (i.e. 1 atm/101 kPa).

In some embodiments, the pressure $P_1$ of the gas may be more (i.e. greater) than 1 atm (101 kPa). For example, the pressure $P_1$ of the gas may be equal to or more than 2 atm (203 kPa), or equal to or more than 3 atm (304 kPa), or equal to or more than 4 atm (405 kPa), such as equal to or more than 5 atm (507 kPa). In this way, it may be possible to operate the 3D printing apparatus on Earth under atmospheric pressure (i.e. 1 atm/101 kPa).

In some embodiments, the 3D printing assembly may comprise a printing platform. Suitably, the printing platform may be arranged for receiving printing material extruded out of the second chamber through the nozzle. For example, the printing platform may be positioned generally adjacent to (i.e. next to) the nozzle.

In some embodiments, the 3D printing assembly may comprise a motor arranged to rotate the 3D printing apparatus with respect to the printing platform. For example, the motor may be arranged to rotate the 3D printing assembly in an X and Y axis with respect to the printing platform.

In some embodiments, the 3D printing assembly may comprise a linear pushing mechanism arranged to move the printing platform away from the nozzle. For example, the linear pushing mechanism may be arranged to move the printing platform away from the nozzle in a Z axis with respect to the printing platform. Suitably, the linear pushing mechanism may comprise one or more motor driven wheels.

In this way, in order to print a cylindrical (i.e. round) beam, the motor may be conveniently arranged to rotate the 3D printing assembly in an X and Y axis with respect to the printing platform, while the printing platform is incrementally pushed away from the 3D printing assembly in a Z axis by the linear pushing mechanism with each full (i.e. 360°) rotation of the 3D printing assembly. Thus, the printing (i.e. extrusion of the printing material from the nozzle) may be in a continuous spiral movement with respect to the printing platform. The ratio between the speed of rotation and speed of linear pushing may conveniently be tuned in order to increase or decrease the size of the layers of the extruded printing material.

In some embodiments, the 3D printing assembly may comprise a curing device. The curing device may conveniently be arranged to cure the printing material as it is extruded out of the second chamber through the nozzle. Curing of the printing material may suitably cause it to harden to form a solid 3D printed structure.

Suitably, the curing device may comprise an ultraviolet (UV) light source. When the printing material is a liquid photopolymer, the presence of UV light may photopolymerise the liquid photopolymer causing it to harden to form a solid 3D printed structure.

In some embodiments, the curing device may comprise an opaque screen. The opaque screen may suitably be arranged to shade at least a portion of the nozzle from the UV light source. In this way, only a trailing edge of the freshly printed (i.e. extruded) layer of printing material may be exposed to the ultraviolet light source. This may advantageously help to prevent premature curing of the printing material close to and/or inside the nozzle.

In some embodiments, the 3D printing assembly may comprise a sealing element for reversibly engaging with and sealing an end of the nozzle. In this way, extrusion of the printing material from the second chamber out of the nozzle may be prevented when the 3D printing apparatus is exposed to an external environment having a pressure $P_2$ being less than the pressure $P_1$ of the gas in the first chamber. Suitably, the sealing element may comprise a plug. The plug may conveniently reversibly block an end of the nozzle. Beneficially, the plug seals the nozzle only temporarily to prevent leakage of the printing material when there is a pressure differential, but the desired application does not need the printing material to be extruded. It will be appreciated that the nozzle is fabricated using a material that is compatible with the printing material and the external conditions. Optionally, the nozzle is fabricated using polymers (e.g., nylon, polypropylene), rubber (e.g., silicone), metal (e.g., stainless steel), and so on.

In some embodiments, the 3D printing assembly may comprise a first inlet in fluid connection with the first chamber. The first inlet may suitably be arranged for introducing gas having a pressure $P_1$ into the first chamber. The first inlet may suitably be threaded to allow connection of one or more pipes to the first inlet. It will be appreciated that the first inlet may be connected to a gas collector via the one or more pipes. Optionally, the gas collector may collect gas produced as a by-product by various other processes of a habitat comprising the 3D printing assembly.

In some embodiments, the 3D printing assembly may comprise a second inlet in fluid connection with the second chamber. The second inlet may suitably be arranged for introducing printing material into the second chamber. The second inlet may suitably be threaded to allow connection of one or more pipes to the second inlet. Similar to the first inlet, it will be appreciated that the second inlet may be connected to a bulk reservoir of the printing material via the one or more pipes. Optionally, the bulk reservoir may be configured to store a pre-mix of the printing material or components of the printing material for on-the-fly mixing thereof for subsequent extrusion thereof out of the second chamber through the nozzle of 3D printing assembly.

Beneficially, a synergistic effect of employing a combination of pressure differential and seals in 3D printing, as opposed to extrusion forces from mechanical, hydraulic, or electromagnetic extrusion forces, is the improve the overall performance and quality of the 3D printing process. Particularly, proper sealing can help minimize wear and tear on the printing system's components. This, coupled with precise pressure control, can reduce the need for frequent maintenance and downtime, leading to increased overall efficiency. The key synergistic effect includes enhanced precision of printing material deposition for achieving intricate details and complex geometries in 3D printed objects (by monitoring under-extrusion, over-extrusion, or irregular layering), while reducing material wastage by preventing the expensive or specialized printing material from leaking or oozing out of unintended areas during 3D printing. Moreover, the combination of pressure and sealing can improve layer adhesion, ensuring that the printed layers bond well to each other resulting in stronger and more durable 3D printed objects, reducing the risk of delamination or structural weaknesses. Furthermore, the synergistic effect allows for versatility in adapting the 3D printing process to various materials, viscosities, and applications. It can accommodate both high-viscosity and low-viscosity materials and adapt to different printing conditions, such as 3D printing in space as described herein. Additionally, the precise control offered by the combination of pressure and sealing enables the printing of complex geometries that may be challenging or impossible to achieve with other 3D printing methods.

A second aspect of the invention provides a system for positioning a satellite component, the system comprising a 3D printing apparatus according to a first aspect of the invention and a satellite component attached between the printing platform and a fixed attachment point, wherein the 3D printing apparatus is arranged to print an elongate structure, and wherein printing of the elongate structure is arranged to move the printing platform away from the fixed attachment point to position the satellite component.

The term "fixed attachment point" refers to a specific point within the system that is not intended to move or change position during the operation of the system. The presence of a fixed attachment point suggests that other components in the system, such as the satellite component, the 3D printing apparatus, the printing platform, are movable in relation to it. It will be appreciated that the fixed attachment point may be configured to receive at least partially the 3D printed satellite component from the printing platform which is moved by the linear pushing mechanism.

In some embodiments, the fixed attachment point may form part of the 3D printing apparatus. In this regard, the fixed attachment point may be an extension of the 3D printing apparatus.

Optionally, the fixed attachment point may be arranged at one or more sides of the 3D printing apparatus. In an embodiment, the fixed attachment point is arranged besides a lower portion of the 3D printing apparatus. The fixed attachment point may be arranged such that the printing platform conveniently deposits the printed object, namely the satellite component, thereat by a linear motion of the printing platform by the linear pushing mechanism.

The satellite component may, for example, be a stowed satellite component. Thus, printing of the elongate structure may be arranged to move the printing platform away from the fixed attachment point to unstow the stowed satellite component. The term "stowed satellite component" refers to a satellite subsystem, device, or element that is in a secured, compact, or folded configuration during launch, deployment, or when not actively in use. By moving the printing platform away from the fixed attachment point, the stowed satellite component is unstowed for a potential deployment thereof at the desired location on the satellite. Beneficially, 3D printing process acts as a means to simultaneously create an elongate structure and facilitate the deployment of the unstowed satellite component, to combine manufacturing and deployment functionalities in a single operation.

Positioning the satellite component may suitably comprise unfolding and/or unrolling the satellite component. It will be appreciated that during deployment of the satellite component, such as the stowed satellite component, unfolding and unrolling are common methods for positioning stowed satellite components, and a subsequent transition from a compacted or stowed configuration into an operational state. In this regard, the stowed satellite component is expanded or unfolded by extending its various parts, typically along hinges or pivot points, using mechanical mechanisms, such as springs, latches, or motors, that push, pull, or rotate the component's segments into their operational position. Moreover, unrolling comprises a controlled release of tension or unwinding of the components that are in a coiled or rolled-up state when stowed, by mechanisms like spooling devices or motorized reels. Beneficially, both unfolding and unrolling methods are reliable deployment mechanisms that ensure the intended operational configuration of the satellite component.

In some embodiments, the satellite component may comprise a folded solar panel. In such embodiments, printing of the elongate structure may be arranged to move the printing platform away from the fixed attachment point to unfold the folded solar panel. Solar panels are a critical component of many satellites, as they provide the necessary power for the satellite's systems and instruments. It will be appreciated that when conditions are suitable for deployment, a deployment mechanism is initiated, e.g., remotely from the ground or by onboard systems, to unfold the folded solar panel. Depending on the design, this may involve the rotation of hinge joints or the extension of segments to enable the folded solar panel to gradually takes on its operational configuration.

In some embodiments, the satellite component may comprise a stowed antenna. In such embodiments, printing of the elongate structure may be arranged to move the printing platform away from the fixed attachment point to unfold or unroll the stowed antenna.

Suitably, the printed elongate structure may be a cylinder (i.e. a cylindrical beam). Optionally, the satellite component is printed as a plurality of cylindrical components. In an implementation, the cylindrical beam may serve as a boom or support structure. Optionally, the cylindrical beam extends from the satellite's main body, and may carry antennas, sensors, or other equipment at its end. In another embodiment, the cylindrical beam may serve as a radiating element for communication or scientific experiments. Similarly, the cylindrical beam may serve as a deployable antenna, a sensor enclosure, a structural component that provides support or reinforcement to other satellite elements, and so on.

A third aspect of the invention provides a method of 3D printing a satellite component, the method comprising the steps of

- providing a 3D printing apparatus according to a first aspect of the invention;
- introducing a gas having a pressure $P_1$ into the first chamber;
- introducing a printing material into the second chamber;
- exposing the apparatus to an environment having a pressure $P_2$ being less than the pressure $P_1$ of the gas in the first chamber, such that the gas in the first chamber exerts a force on the seal, which in turn exerts a force on the printing material, thereby extruding the printing material out of the second chamber through the nozzle.

Suitably, the method may comprise controlling the temperature of the printing material being extruded from the nozzle in a range of from −50° C. to 150° C. For example, the method may comprise controlling the temperature of the printing material being extruded from the nozzle in a range of from −20° C. to 150° C.

Throughout the description and claims of this specification, the words "comprise" and "contain" and variations of the words, for example "comprising" and "comprises", mean "including but not limited to", and do not exclude other components, integers or steps. Moreover, the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

BRIEF DESCRIPTION OF THE DRAWINGS

One or more embodiments of the invention will now be described, by way of example only, with reference to the accompanying drawings, in which.

DETAILED DESCRIPTION

Figure 1:
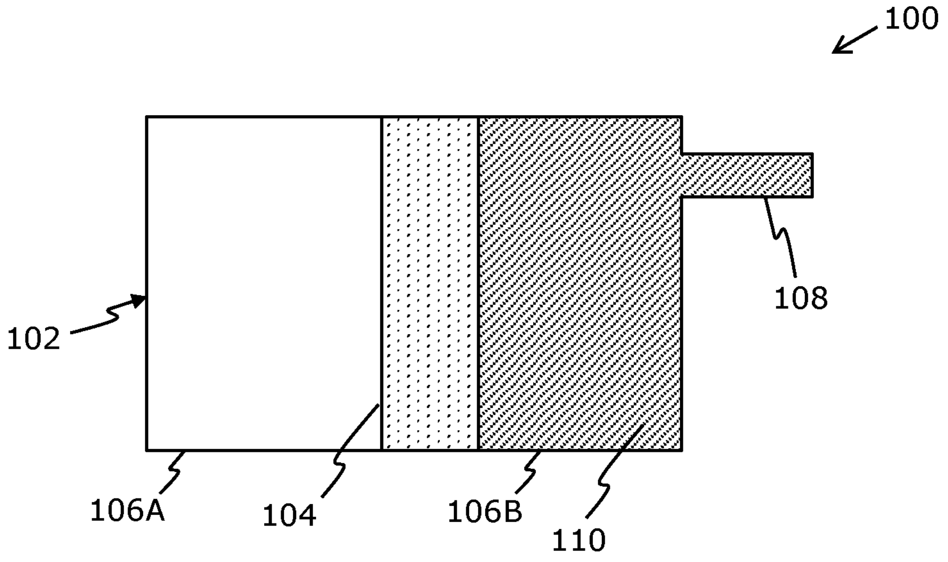
FIG. 1 is a schematic illustration of a 3D printing apparatus in accordance with a first embodiment of the invention.

Referring to FIG. 1, a 3D printing apparatus 100 in accordance with a first embodiment of the invention comprises a housing 102, a seal 104 arranged movably inside the housing 102 such that the seal 104 partitions the housing 102 into a first chamber 106A and a second chamber 106B that are fluidically isolated from each other, and a nozzle 108 in fluid connection with the second chamber 106B.

The first chamber 106A comprises a gas having a pressure $P_1$ and the second chamber 106B comprises a printing material 110. When the 3D printing apparatus 100 is exposed to an external environment having a pressure $P_2$ being less than the pressure $P_1$ of the gas in the first chamber 106A, the gas in the first chamber 106A expands. This exerts a force on the seal 104 which in turn exerts a force on the printing material 110, thereby extruding the printing material 110 out of the second chamber 106B through the nozzle 108.

Figure 2:
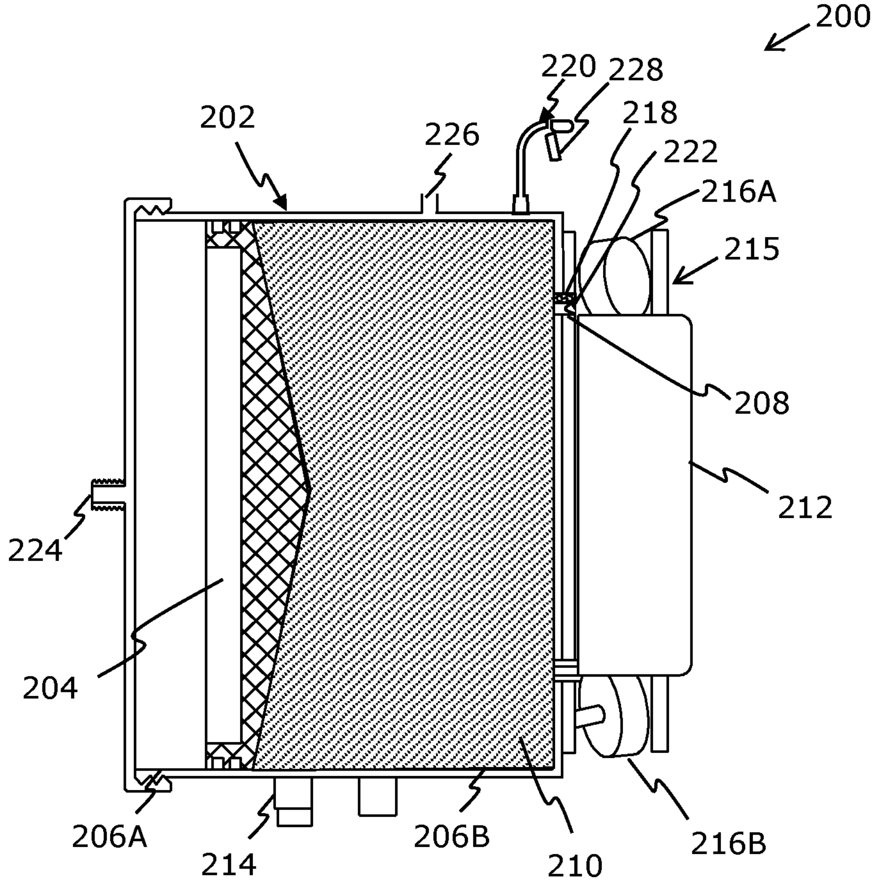
FIG. 2 is an illustration of a cross-sectional view of a 3D printing apparatus in accordance with a second embodiment of the invention.

Referring to FIG. 2, a 3D printing apparatus 200 in accordance with a second embodiment of the invention comprises a housing 202, a seal 204 arranged movably inside the housing 202 such that the seal 204 partitions the housing 202 into a first chamber 206A and a second chamber 206B that are fluidically isolated from each other, and a nozzle 208 in fluid connection with the second chamber 206B.

The first chamber 206A comprises argon gas having a pressure $P_1$ and the second chamber 206B comprises a liquid photopolymer 210. In this example, the liquid photopolymer 210 comprises a mixture of styrene and benzophenone.

When the 3D printing apparatus 200 is exposed to an external environment having a pressure $P_2$ being less than the pressure $P_1$ of the argon gas in the first chamber 206A, the argon gas in the first chamber 206A expands. This exerts a force on the seal 204 which in turn exerts a force on the liquid photopolymer 210, thereby extruding the liquid photopolymer 210 out of the second chamber 206B through the nozzle 208.

The 3D printing apparatus 200 further comprises a printing platform 212, a motor 214, a linear pushing mechanism 215 comprising two motor driven wheels 216A, 216B, a Peltier module 218, a UV light source 220, a plug 222, a first inlet 224 for introducing argon gas having a pressure $P_1$ into the first chamber 206A, and a second inlet 226 for introducing the liquid photopolymer 210 into the second chamber 206B. The printing platform 212 is positioned adjacent to the nozzle 208 for receiving the liquid photopolymer 210 that is extruded out of the second chamber 206B through the nozzle 208, when the 3D printing apparatus 200 is in use.

The 3D printing apparatus 200 may be used to print a cylindrical beam (not shown in the FIG. 2). In order to achieve this, the motor 214 rotates the 3D printing apparatus 200 with respect to the printing platform 212, while the printing platform 212 is moved away from the nozzle 208 by the linear pushing mechanism 215. In this way, the 3D printing apparatus 200 prints in a spiral movement to generate the cylindrical beam. The ratio between the speed of rotation of the motor 214 and speed of the linear pushing of the printing platform 212 away from the 3D printing apparatus 200 can be tuned in order to increase or decrease the size of the layers of the liquid photopolymer 210 extruded from the nozzle 208.

Furthermore, the Peltier module 218 is used to control the temperature of the nozzle 208, which in turn controls the viscosity of the liquid photopolymer 210 extruded through the nozzle 208. The viscosity of the liquid photopolymer 210 is inversely proportional to the temperature of the nozzle 208. Hence, when the viscosity of the liquid photopolymer 210 is lower than a required viscosity, then the Peltier module 218 is used to increase the temperature of the nozzle 208 to increase the viscosity of the liquid photopolymer 210. Alternatively, when the viscosity of the printing material 210 is greater than a required viscosity, the Peltier module 218 decreases the temperature of the nozzle 108 to increase the viscosity of the liquid photopolymer 210.

Significantly, the Peltier module 218 can be used to cool the nozzle to temperatures below 0° C., which allows the viscosity of the liquid photopolymer 210 to be increased sufficiently in order to make it solid enough to be extruded via the nozzle 208 and for it to stay in place on the printing platform 212 after extrusion so that it can be hardened in its extruded form.

The UV light source 220 emits ultraviolet light, thereby curing (i.e. hardening) the liquid photopolymer 210 extruded out of the second chamber 206B through the nozzle 208. The UV light source 220 is arranged to be directed towards a region in proximity of an end of the nozzle 208 from which the printing material 210 is extruded. The UV light source 220 is partially covered by an opaque screen 228. The opaque screen 228 is positioned to provide a partially shaded region around the end of the nozzle 208 from the UV light source 220, when the 3D printing apparatus 200 is in use.

The plug 222 is used to reversibly seal an end of the nozzle 208. When the plug 222 is sealing an end of the nozzle 208, extrusion of the printing material from the second chamber 206B out of the nozzle 208 is prevented when the 3D printing apparatus is exposed to an external environment having a pressure $P_2$ being less than the pressure $P_1$ of the gas in the first chamber.

Figure 3:
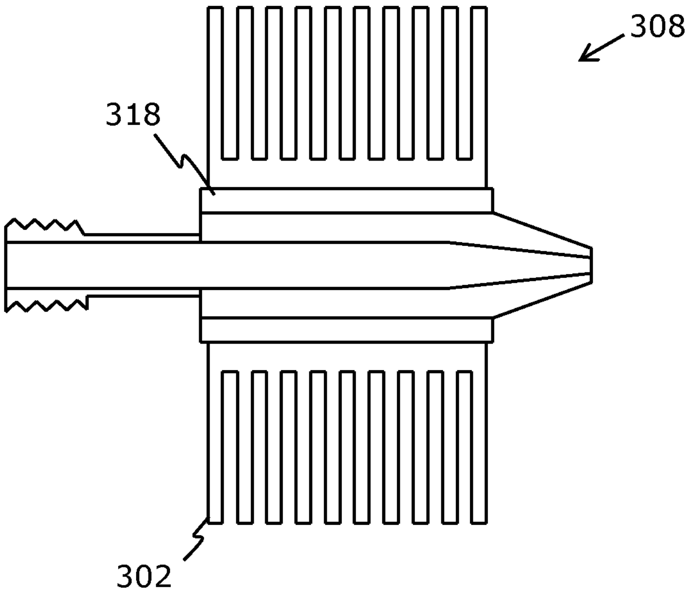
FIG. 3 is an illustration of a nozzle in accordance with an embodiment of the invention.

Referring to FIG. 3, a nozzle 308 in accordance with an embodiment of the invention comprises a Peltier module 318 and a plurality of radiator fins 302 which act as a heat exchanger. The Peltier module 318 is used to control the temperature of the printing material being extruded from the nozzle in a range of from −50° C. to 150° C. The Peltier module 318 may generate heat and/or remove heat by regulating a voltage that may be applied to a power input of the Peltier module. Significantly, the Peltier module 318 can be used to cool the nozzle 308 to temperatures below 0° C., which allows the viscosity of the printing material to be increased sufficiently in order to make it solid enough to be extruded via the nozzle 308 and for it to stay in place (i.e. maintain its physical form) after extrusion from the nozzle 308 so that it can be hardened in its extruded form.

Figure 4:
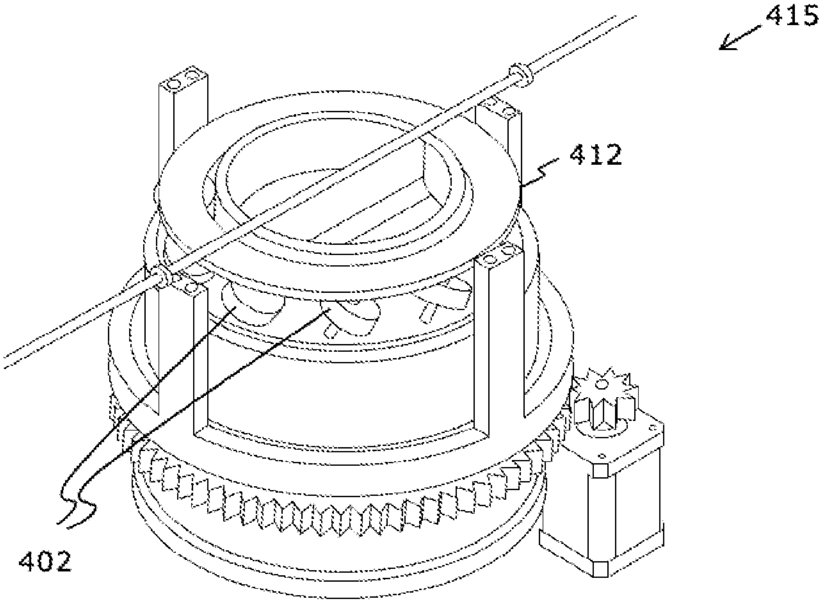
FIG. 4 is an illustration of a linear pushing mechanism in accordance with an embodiment of the invention.

Referring to FIG. 4, a linear pushing mechanism 415 in accordance with an embodiment of the invention comprises a plurality of motor driven wheels 402, which are positioned around the sides of a cylindrical printing platform 412 at an angle. The plurality of motor driven wheels 402 are each in contact with the printing platform 412. The plurality of motor driven wheels 402 spin around and, due to their angled orientation, exert a linear force on the printing platform 412, thereby moving the printing platform 412 in a linear direction.

Figure 5A:
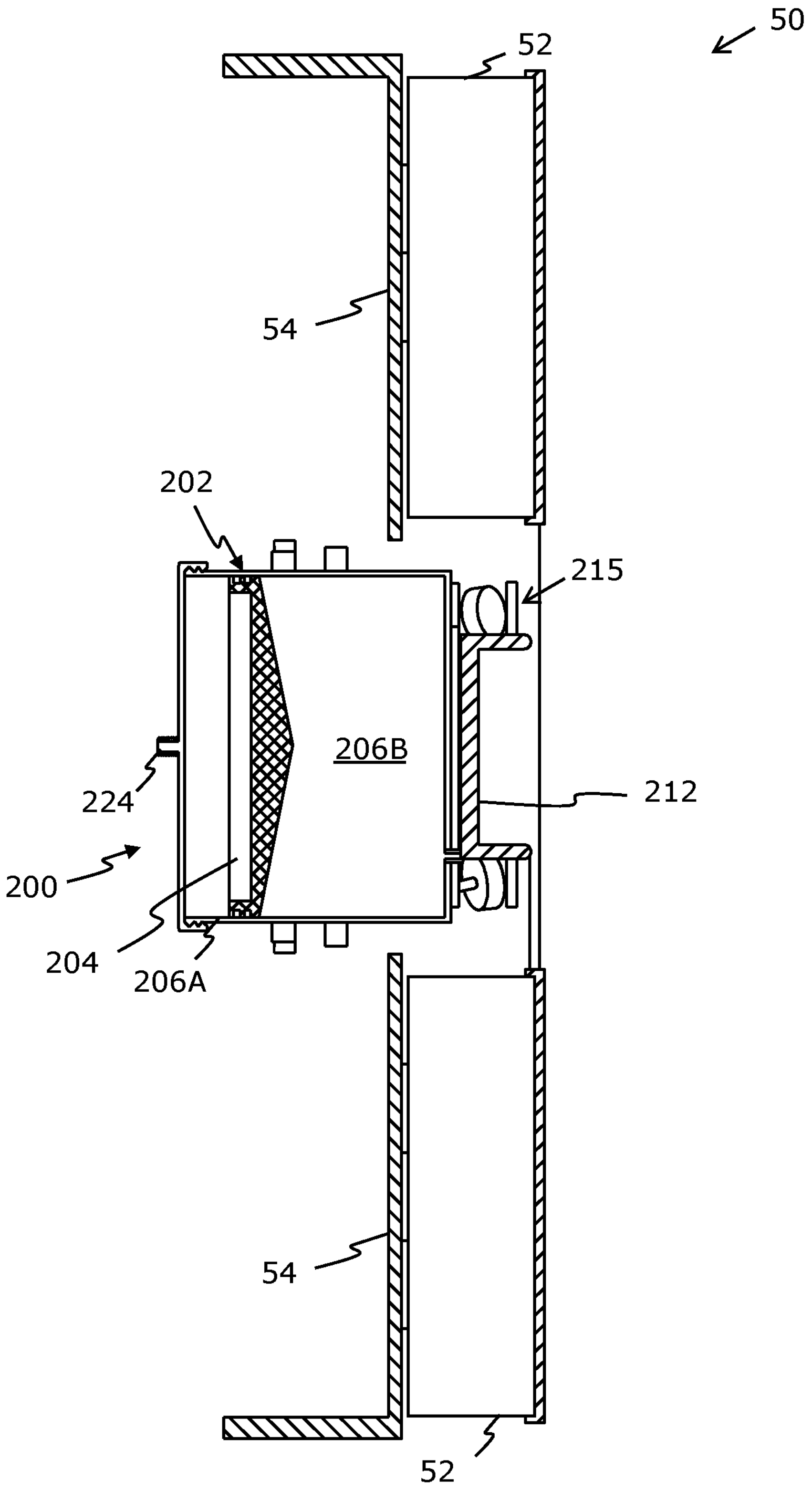
FIGS. 5A and 5B illustrate a system for unfolding a solar panel comprising a 3D printing apparatus according to the second embodiment of the invention.
Figure 5B:
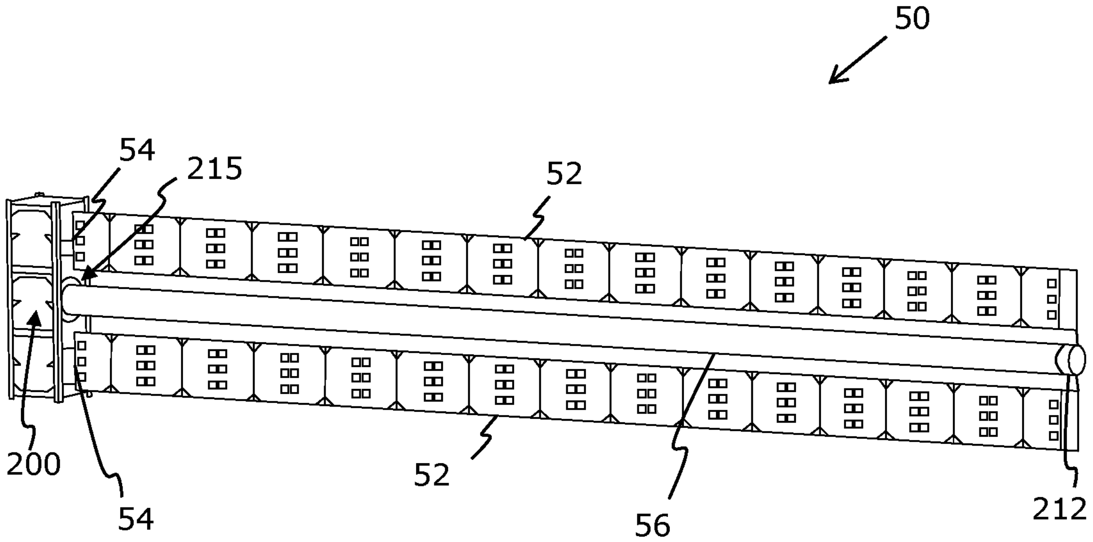

Referring collectively to FIGS. 5A and 5B, a system 50 for unfolding a folded solar panel 52 comprises a 3D printing apparatus 200 in accordance with the second embodiment of the invention and a folded solar panel 52. The folded solar panel 52 is attached between the printing platform 212 of the 3D printing apparatus 200 and an attachment point 54 fixed to the 3D printing apparatus 200.

FIG. 5B provides a perspective view of the system 50 in a deployed configuration, wherein the folded solar panel 52 has been unfolded once the 3D printing apparatus 200 has printed a cylinder 56. During printing of the cylinder by the 3D printing apparatus 200, the 3D printing apparatus 200 is rotated relative to the printing platform 212 in directions corresponding to the X and Y axis. Simultaneously, the printing platform 212 is gradually moved away from the fixed attachment point 54 in the Z axis by the linear pushing mechanism 215. The printing platform 212 is of equal diameter to the diameter of the printed cylinder 56. The cylinder 56 is printed in a layer-by-layer manner, so that the cylinder 56 slowly extends outward from the 3D printing apparatus 200 with each printed layer. Hence, printing of the cylinder 56 by 3D printing apparatus 200 gradually unfolds the folded solar panel 52.

Figure 6:
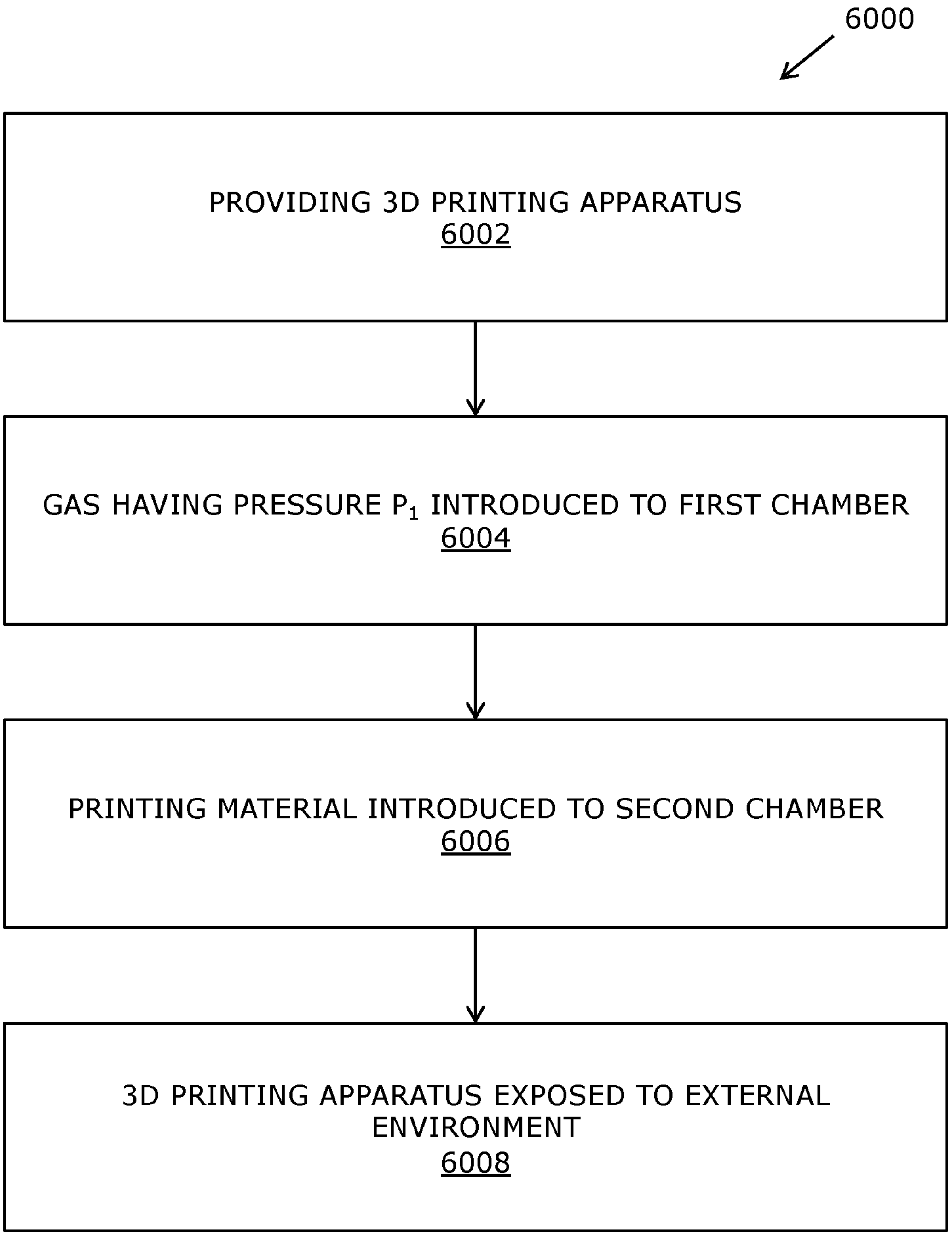
FIG. 6 is an illustration of a flowchart depicting steps of a method for 3D printing in accordance with an embodiment of the invention.

FIG. 6 provides a flowchart depicting the steps of a method 6000 of 3D printing a satellite component, in accordance with an embodiment of the invention. At step 6002, a 3D printing apparatus is provided, the 3D printing apparatus comprising: a housing; a seal arranged movably inside the housing such that the seal partitions the housing into first and second chambers that are fluidically isolated from each other; and a nozzle in fluid connection with the second chamber. At step 6004, a gas having a pressure $P_1$ is introduced into the first chamber. At step 6006, a printing material is introduced into the second chamber. At step 6008, the 3D printing apparatus is exposed to an external environment having a pressure $P_2$ being less than the pressure $P_1$ of the gas in the first chamber, such that the gas in the first chamber exerts a force on the seal, which in turn exerts a force on the printing material, thereby extruding the printing material out of the second chamber through the nozzle.

The invention claimed is:

1. A system, comprising:

a 3D printing apparatus including:

a housing;

a seal arranged movably inside the housing such that the seal partitions the housing into first and second chambers that are fluidically isolated from each other, the first chamber comprising a gas having a constant pressure $P_1$;

the second chamber comprising a printing material; and a nozzle in fluid connection with the second chamber;

wherein when the 3D printing apparatus is exposed to an external environment having a pressure $P_2$ being less than the constant pressure $P_1$ of the gas in the first chamber, the gas in the first chamber that maintains the constant pressure $P_1$ exerts a force on the seal which in turn exerts a force on the printing material thereby extruding the printing material out of the second chamber through the nozzle to print the satellite component; and a satellite component attached between a printing platform and a fixed attachment point, wherein the 3D printing apparatus is arranged to print an elongate structure, and wherein printing of the elongate structure is arranged to move the printing platform away from the fixed attachment point to position the satellite component;

wherein the satellite component is arranged to unfold or unroll based on printing the elongate structure.

2. The system of claim 1, wherein the nozzle comprises a temperature control module, wherein the temperature control module comprises a Peltier module.

3. The system of claim 2, wherein the temperature control module is arranged to control the temperature of the printing material being extruded from the nozzle in a range of from −50° C. to 150° C., or in a range of from −20° C. to 150° C.

4. The system of claim 1, wherein the printing material comprises a liquid photopolymer.

5. The system of claim 1, wherein the gas is a noble gas including one or more of neon, argon, krypton, or xenon.

6. The system of claim 1, wherein the constant pressure $P_1$ of the gas is less than 1 atm.

7. The system of claim 1, wherein the printing platform is configured to receive the printing material extruded out of the second chamber through the nozzle, and wherein the printing platform is positioned adjacent to the nozzle.

8. The system of claim 7, comprising a motor arranged to rotate the 3D printing apparatus with respect to the printing platform.

9. The system of claim 7, comprising a linear pushing mechanism arranged to move the printing platform away from the nozzle.

10. The system of claim 9, wherein the linear pushing mechanism comprises one or more motor driven wheels.

11. The system of claim 1, comprising a curing device for curing printing material extruded out of the second chamber through the nozzle.

12. The system of claim 11, wherein the curing device comprises an ultraviolet light source, and wherein the curing device comprises an opaque screen for shading at least a portion of the nozzle from the ultraviolet light source.

13. The system of claim 1, comprising a sealing element for reversibly sealing an end of the nozzle, wherein the sealing element comprises a plug.

14. The system of claim 1, comprising a first inlet in fluid connection with the first chamber for introducing the gas having a constant pressure $P_1$ into the first chamber; and a second inlet in fluid connection with the second chamber for introducing the printing material into the second chamber.

15. The system of claim 1, wherein the satellite component comprises a folded solar panel, and wherein printing of the elongate structure is arranged to move the printing platform away from the fixed attachment point to unfold the folded solar panel; or a stowed antenna, and wherein printing of the elongate structure is arranged to move the printing platform away from the fixed attachment point to unfold or unroll the stowed antenna.

16. The system of claim 1, wherein the printed elongate structure is a cylinder.

17. A system, comprising:

a 3D printing apparatus including:

a housing;

a seal arranged movably inside the housing such that the seal partitions the housing into first and second chambers that are fluidically isolated from each other, the first chamber comprising a gas having a pressure $P_1$;

the second chamber including a printing material; and a nozzle in fluid connection with the second chamber;

wherein when the 3D printing apparatus is exposed to an external environment having a pressure $P_2$ being less than the pressure $P_1$ of the gas in the first chamber, the gas in the first chamber exerts a force on the seal which in turn exerts a force on the printing material thereby extruding the printing material out of the second chamber through the nozzle to print a satellite component;

wherein the satellite component is attached between a printing platform and a fixed attachment point, wherein the 3D printing apparatus is arranged to print an elongate structure, and wherein printing of the elongate structure is arranged to move the printing platform away from the fixed attachment point to position the satellite component; and wherein the satellite component includes a folded solar panel, and wherein printing of the elongate structure is arranged to move the printing platform away from the fixed attachment point to unfold the folded solar panel.

18. A system, comprising:

a 3D printing apparatus including:

a housing;

a seal arranged movably inside the housing such that the seal partitions the housing into first and second chambers that are fluidically isolated from each other, the first chamber comprising a gas having a pressure $P_1$;

the second chamber including a printing material; and a nozzle in fluid connection with the second chamber;

wherein when the 3D printing apparatus is exposed to an external environment having a pressure $P_2$ being less than the pressure $P_1$ of the gas in the first chamber, the gas in the first chamber exerts a force on the seal which in turn exerts a force on the printing material thereby extruding the printing material out of the second chamber through the nozzle to print a satellite component;

wherein the satellite component is attached between a printing platform and a fixed attachment point, wherein the 3D printing apparatus is arranged to print an elongate structure, and wherein printing of the elongate structure is arranged to move the printing platform away from the fixed attachment point to position the satellite component; and wherein the satellite component includes a stowed antenna, and wherein printing of the elongate structure is arranged to move the printing platform away from the fixed attachment point to unfold or unroll the stowed antenna.

* * * * *